United States Patent
Miyahara et al.

(10) Patent No.: US 9,502,072 B2
(45) Date of Patent: Nov. 22, 2016

(54) IMAGING APPARATUS THAT GENERATES MOTION IMAGE DATA HAVING A FIRST FRAME RATE FOR A SLOW SPEED STRETCH AND MOTION IMAGE DATA HAVING A SECOND FRAME RATE FOR A NORMAL SPEED STRETCH

(71) Applicant: Panasonic Intellectual Property Management Co., Ltd., Osaka (JP)

(72) Inventors: Hiroyuki Miyahara, Kanagawa (JP); Hiroyuki Takeuchi, Osaka (JP); Hiroaki Kanto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 14/547,176

(22) Filed: Nov. 19, 2014

(65) Prior Publication Data
US 2015/0147042 A1    May 28, 2015

(30) Foreign Application Priority Data

Nov. 25, 2013  (JP) .................................. 2013-242611
Nov. 5, 2014   (JP) .................................. 2014-224814

(51) Int. Cl.
*H04N 5/77*     (2006.01)
*G11B 27/00*    (2006.01)
*H04N 5/783*    (2006.01)

(52) U.S. Cl.
CPC .............. *G11B 27/005* (2013.01); *H04N 5/772* (2013.01); *H04N 5/783* (2013.01)

(58) Field of Classification Search
CPC ................ G11B 27/005; H04N 5/783; H04N 5/23245; H04N 5/772; H04N 9/7908; H04N 9/80
USPC ................................................ 386/343, 224
See application file for complete search history.

(56) References Cited

U.S. PATENT DOCUMENTS

| | | | | |
|---|---|---|---|---|
| 5,543,927 A | * | 8/1996 | Herz ...................... | H04N 5/783 386/230 |
| 5,604,602 A | * | 2/1997 | Guillotel .............. | H04N 19/147 348/398.1 |
| 2001/0051035 A1 | * | 12/2001 | Brandsma .............. | H04N 5/783 386/343 |

(Continued)

FOREIGN PATENT DOCUMENTS

| | | | |
|---|---|---|---|
| JP | 2006-40395 A | * | 2/2006 |
| JP | 2008109245 | * | 5/2008 |

(Continued)

OTHER PUBLICATIONS

Imagawa, machine generated translation of JP 2006-040395A, Feb. 2006.*

(Continued)

*Primary Examiner* — David Harvey
(74) *Attorney, Agent, or Firm* — Wenderoth, Lind & Ponack, L.L.P.

(57) ABSTRACT

The present disclosure aims to achieve a more effective image in slow motion. An imaging apparatus of the present disclosure includes an image sensor that outputs image data at a first frame rate and an image processor. The image processor: (i) generates motion image data having a second frame rate that is 1/N of the first frame rate, based on the image data having the first frame rate output from the image sensor, for frames not provided with a given instruction, (ii) generates motion image data having the first frame rate based on the image data having the first frame rate output from the image sensor, for frames provided with a given instruction and (iii) processes the generated motion image data having the first frame rate and the generated motion image data having the second frame rate as a series of motion image data.

2 Claims, 4 Drawing Sheets

(56) References Cited

U.S. PATENT DOCUMENTS

| | | | |
|---|---|---|---|
| 2006/0251398 A1* | 11/2006 | Ando | G10K 15/04 386/288 |
| 2009/0073311 A1* | 3/2009 | Hamada | H04N 7/0132 348/441 |
| 2010/0060752 A1* | 3/2010 | Tokuyama | G07F 17/32 348/240.3 |
| 2010/0295970 A1* | 11/2010 | Suzuki | H04N 5/232 348/240.3 |

FOREIGN PATENT DOCUMENTS

| | | |
|---|---|---|
| JP | 2010-147774 | 7/2010 |
| JP | 2011-009970 | 1/2011 |

OTHER PUBLICATIONS

Tokuyama, machine generated translation of jP 2008109245, May 2008.*

* cited by examiner

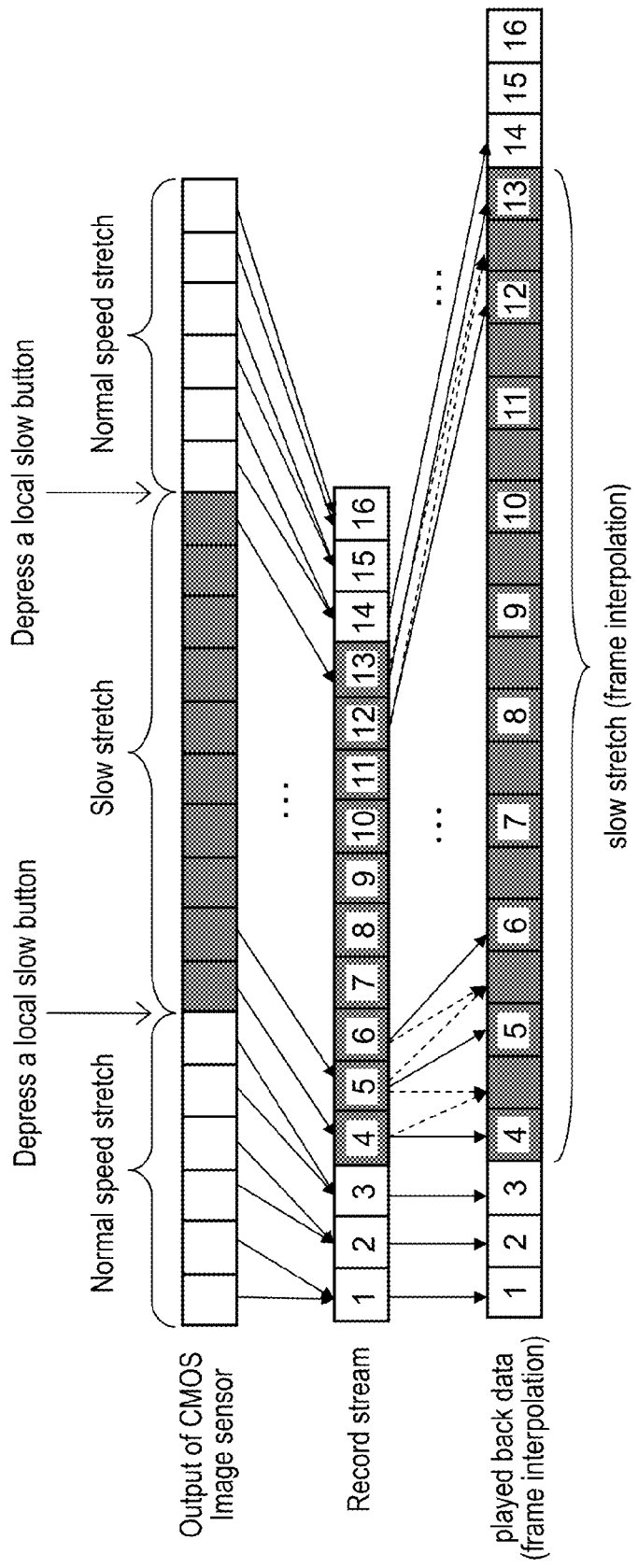

IMAGING APPARATUS THAT GENERATES MOTION IMAGE DATA HAVING A FIRST FRAME RATE FOR A SLOW SPEED STRETCH AND MOTION IMAGE DATA HAVING A SECOND FRAME RATE FOR A NORMAL SPEED STRETCH

BACKGROUND

Technical Field

The present disclosure relates to an imaging apparatus and a method for imaging a subject.

Background Art

Patent Literature 1 discloses an imaging apparatus including an imaging section that outputs images at a frame rate higher than a frame rate of a display section. This imaging apparatus plays back an image at a speed such as ½ times speed or ¾ times speed by recording signals of averaged two frames or three frames.

RELATED ART LITERATURE

Patent Literature

PTL 1: Unexamined Japanese Patent Publication No. 2010-147774

SUMMARY

The present disclosure aims to provide an imaging apparatus and a method for imaging a subject. The apparatus and the method aim to achieve a more effective image in slow motion. To achieve the foregoing objective, the imaging apparatus disclosed in this disclosure includes an image sensor and an image processor. The image sensor outputs image data at a first frame rate. The image processor: (i) generates motion image data having a second frame rate that is 1/N (N is an integer) of the first frame rate based on the image data having the first frame rate output from the imaging sensor, for frames not provided with a given instruction, (ii) generates motion image data having the first frame rate based on the image data having the first frame rate output from the imaging sensor, for frames provided with a given instruction, and (iii) processes the generated motion image data having the first frame rate and the generated motion image data having the second frame rate as a series of motion image data.

The imaging method comprises:
 a step of generating motion image data having the first frame rate based on the image data having the first frame rate output from the image sensor for frames provided with a given instruction;
 a step of generating motion image data having a second frame rate that is 1/N (N is an integer) of the first frame rate based on the image data having the first frame rate output from the image sensor for frames not provided with a given instruction; and
 a step of processing the generated motion image data having the first frame rate and the generated motion image data having the second frame rate as a series of motion image data.

The present disclosure provides the imaging apparatus and the imaging method that can produce a more effective image in slow motion.

BRIEF DESCRIPTION OF DRAWINGS

FIG. 4 schematically illustrates relations among an output from a CMOS image sensor, a record stream, and played back data.

DETAILED DESCRIPTION OF PREFERRED EMBODIMENTS

An exemplary embodiment of the present disclosure will be detailed below with reference to the accompanying drawings. An excessive description is omitted. For instance, a description of a well-known subject in a public domain is omitted, or a description of a similar element to that discussed previously is omitted for avoiding redundancy and facilitating an ordinary skilled person in the art to understand the present disclosure.

The inventors provide the accompanying drawings and the description for the ordinary skilled person in the art to fully understand the disclosure, so that these materials may not limit the scope of the claims.

A number of methods for measuring an object distance, a distance from an imaging apparatus to an object includes a depth from Defocus (DFD) method that utilizes correlation values of defocusing amounts generated in image captured with a camera. In general, a defocusing amount is uniquely determined for each imaging apparatus in response to a relation between a focal position and the object distance. In the DFD method utilizing the above characteristics, two images having different defocus amounts are produced, and the object distance is measured based on a point-spread function (PSF) and a difference in the defocusing amounts. The imaging apparatus in accordance with this embodiment measures the object distance by utilizing the DFD calculation to perform an auto-focus control.

A structure and operation of the imaging apparatus in accordance with the embodiment will be described below.

1. Electrical Structure of Imaging apparatus

Figure 1:
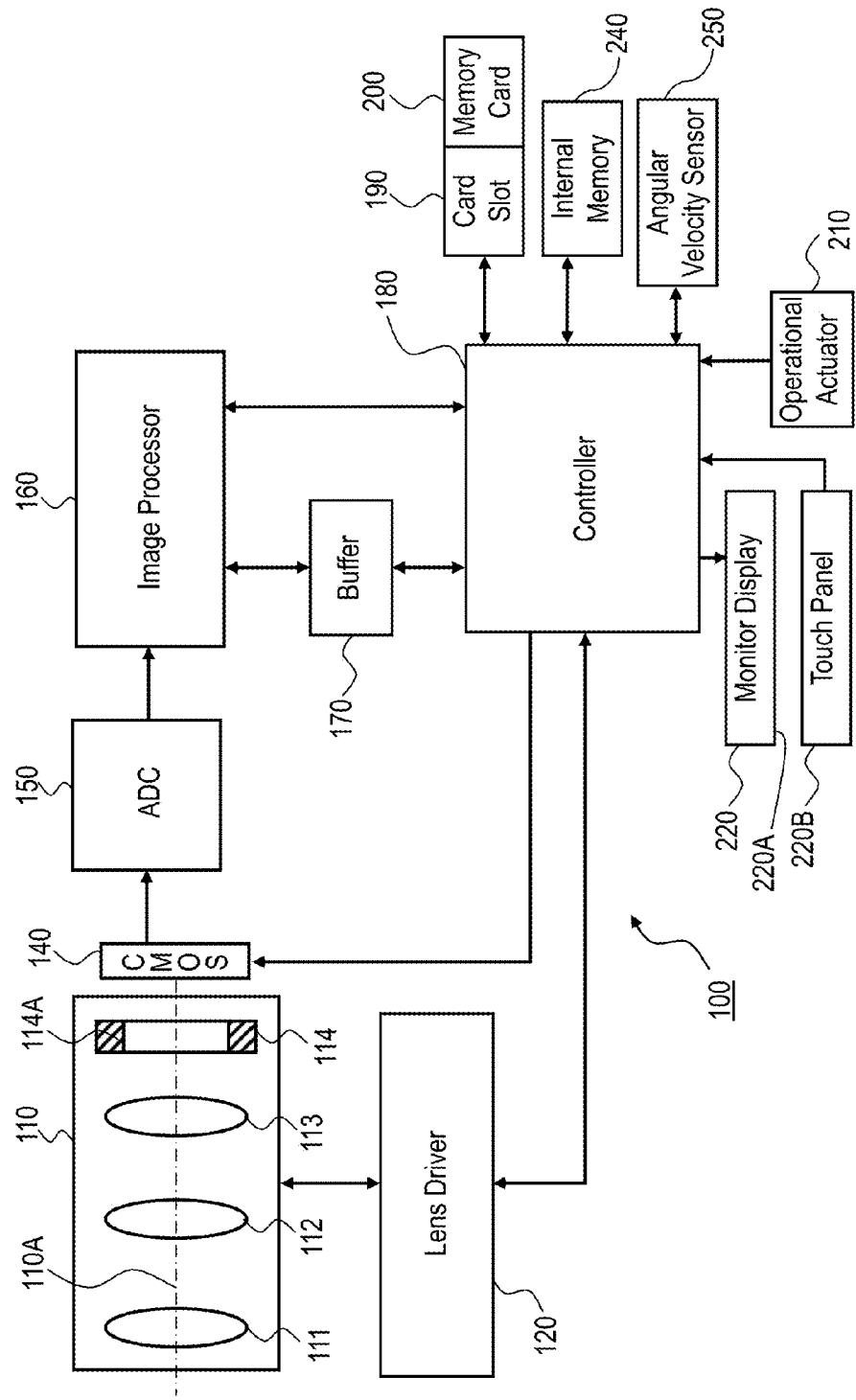
FIG. 1 is a block diagram illustrating an electrical structure of a digital video camera in accordance with an embodiment of the present disclosure.

FIG. 1 is a block diagram of digital video camera 100, an imaging apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with A/D converter (ADC) 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110X to enlarge and reduce the object image. Focus lens 113 moves along optical axis 110X to adjust a focus of the object image. Camera-shake correcting lens 112 is movable within a plane perpendicular to optical axis 110X of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110X, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. CMOS image sensor 140 performs various operations, such as exposure, transfer, and electronic shutter. CMOS image sensor 140 allows outputting image data at a frame rate of 60 frames per second (60 fps) or 120 frames per second (120 fps).

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Image processor 160 provides the imaging data, output from CMOS image sensor 140 at 120 fps, with different image processing methods depending on a normal shooting speed and a high shooting speed during a stretch in the slow shooting mode. In the case of normal shooting speed mode, image processor 160 generates motion image data having a frame rate of 60 fps based on the motion image data output at 60 fps from CMOS image sensor 140. During the normal shooting in a stretch of slow shooting mode, image processor 160 provides the image data output at 120 fps from CMOS image sensor 140 with an additive synthesis process every two consecutive frames, thereby generating motion image data having a frame rate of 60 fps (hereinafter this is referred to as frame additive synthesis mode). Then controller 180 stores the generated motion image data of 60 fps in memory card 200. On the other hand, during a high speed shooting in the stretch of slow shooting mode, image processor 160 provides the image data output at 120 fps from CMOS image sensor 140 with no additive synthesis process, thereby generating motion image data to be played back at 60 fps (hereinafter this is referred to as frame non-additive synthesis mode). Controller 180 then stores the generated motion image data in memory card 200. Since the image data output at 120 fps from CMOS image sensor 140 has not undergone the additive synthesis process, and all the frames have been recorded for generating the motion image data, the motion image data at ½ times speed can be obtained.

In this embodiment, the shot image data is supplied at a rate of 120 fps from CMOS image sensor 140; however, the rate is not limited to this one. For instance, the rate can be 180 fps or 240 fps as long as it is a multiple of 60 fps. In this case, all the frames without the additive synthesis process are recorded for generating the motion image data to be played back at 60 fps, this motion image data can be a motion picture stream to be played back at 1/N times speed of the normal speed such as ⅓ times speed or ¼ times speed.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100.

Operational member 210 includes user interfaces, such as a cross key, an enter-button, for accepting operations by users. Operational member 210 includes a motion picture recording button for giving a command to start/stop recording a motion picture, a local slow button for giving a command to record a part of a motion picture at slow speed during a recording of the motion picture at a normal speed, and a motion picture play-back button for giving a command to start/stop playing back a motion picture. These buttons are used for both starting and stopping the foregoing functions respectively. However, these buttons are not necessarily limited to the combined use. For instance, individual buttons for starting and stopping the function can be prepared. The motion picture recording button, the local slow button, and the motion picture play-back button can be disposed as hard-keys on an outer jacket of digital video camera 100, or these buttons can be soft-keys such as button icons displayed on screen 220A of monitor display 220 and operated via touch panel 220B.

Monitor display 220 has screen 220A that displays thereon an image indicated by the image data produced by CMOS image sensor 140 and an image indicated by the image data read out from memory card 200. Monitor display 220 plays back motion image data of 60 fps recorded in memory card 200 at the rate of 60 frames per second. This mechanism allows playing back the motion image data at a normal speed, this motion image data having a frame rate of 60 fps and generated by providing the image data output at 120 fps from CMOS image sensor 140 with the additive synthesis process during the shooting at the normal speed. On the other hand, the motion image data output at 120 fps from CMOS image sensor 140 without the additive synthesis process during the shooting at the high speed is played back at ½ times speed.

Monitor display 220 displays various menus for setting functions of digital video camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Action of Digital Video Camera

Actions of digital video camera 100 in recording and playing back a motion picture are demonstrated hereinafter with reference to FIGS. 2-4.

2-1. Motion Picture Recording Action

Figure 2:
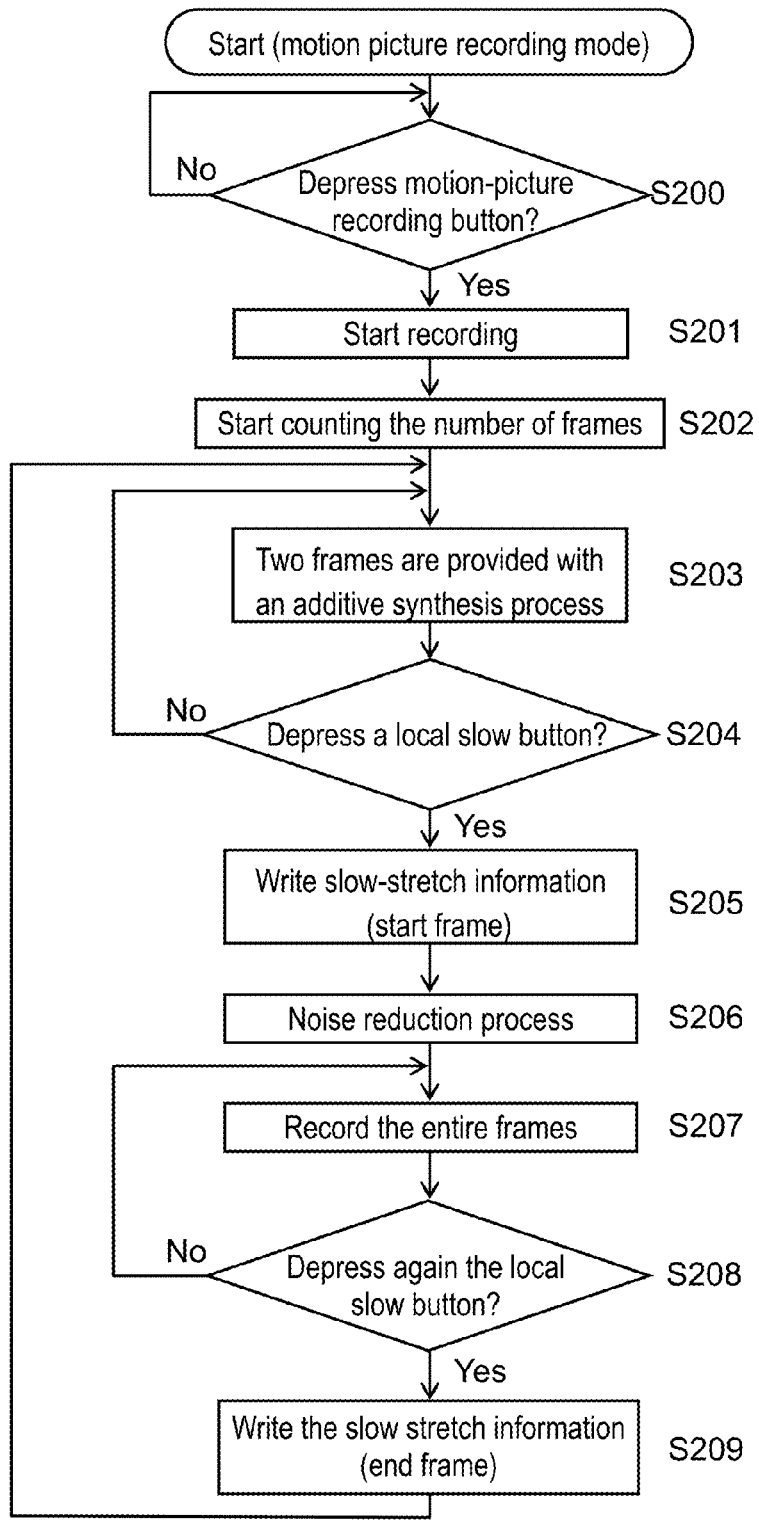
FIG. 2 is a flowchart of recording a motion picture that includes a slow stretch shot with the digital video camera in accordance with the embodiment.
Figure 3:
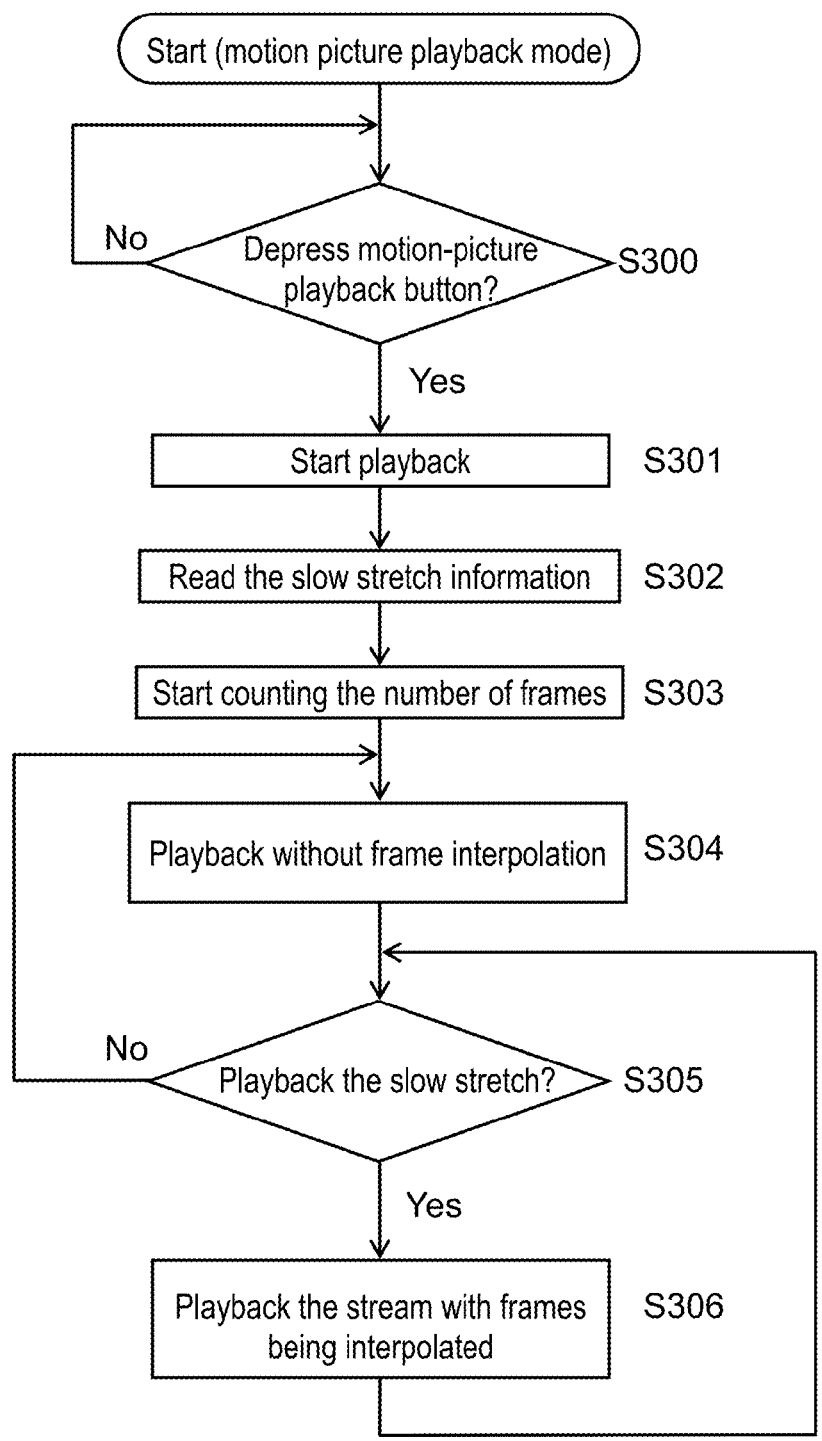
FIG. 3 is a flowchart of playing back the motion picture that includes the slow stretch shot with the digital video camera in accordance with the embodiment.

The action of recording a motion picture is demonstrated with reference with FIG. 2 and FIG. 4. FIG. 2 is a flowchart of recording a motion picture shot with digital video camera 100. This flowchart includes a slow stretch. FIG. 4 schematically illustrates relations among an output from CMOS image sensor 140, a record stream, and played back data.

The power supply of digital video camera 100 is turned on, then controller 180 feeds necessary electric power to each of structural elements of camera 100. Receiving the electric power, each of the structural elements such as lenses of optical system 110 and CMOS image sensor 140 complete initial settings to be ready for action.

Digital video camera 100 includes a motion picture recording mode for recording a motion picture and a motion picture playback mode for playing back a motion picture. Turning on the power supply of digital video camera 100 into the recording mode prompts CMOS image sensor 140 to start shooting a subject image. Monitor display 220 then displays a through-image based on shot image data generated by CMOS image sensor 140. Watching the through-image displayed on monitor display 220, a user determines an angle of view and so on before depressing the motion picture recording button of the operational member 210 at an appropriate timing for starting the record of the motion picture.

As FIG. 2 shows, controller 180 monitors whether or not the motion picture recording button is depressed (step S200). Until the depression of the recording button, controller 180 stays in step S200. Upon the depression of the recording button (branch Yes of step S200), controller 180 prompts image processor 160 to start recording motion image data based on the image shot by CMOS image sensor into memory card 200 (step S201). The motion image data can be temporarily stored in buffer 170 before the data is written into memory card 200. In this case, when the motion image data stored in buffer 170 exceeds a given amount, the exceeding amount can be written into memory card 200 by controller 180.

Receiving the command from step S201 to start recording, controller 180 starts counting the number of frames of the motion image data to be recorded (step S202). At this time, as the record stream shown in FIG. 4 illustrates, controller 180 numbers a frame recorded in the first place as the first frame, and then controller 180 numbers the frames sequentially. For instance, frame number 816 is the frame counted by controller 180 as the 816$^{th}$ frame.

Until a user depresses the local slow button, image processor 160 provides the data output at 120 fps from CMOS image sensor 140 with the additive synthesis process (frame additive synthesis mode) as shown in FIG. 4, and generates the motion image data having a frame rate of 60 fps, namely the number of frames per unit time is halved, and keeps recording the data in memory 200 (step S203).

As FIG. 4 shows, the additive synthesis process in this embodiment synthesizes two consecutive frames (even numbered frame and odd numbered frame) of the image data output at 120 fps from CMOS image sensor 140 into one frame, which is then recorded in a recording stream.

During the record of the motion image data, controller 180 monitors whether or not the local slow button is depressed (step S204). Upon the depression of the local slow button of operational member 210 (branch Yes of step S204), controller 180 writes slow-stretch information (i.e. a serial number of a start frame of the slow-stretch. In the case of example of FIG. 4, the start frame is the fourth frame) into control information that controls the motion image data under recording (step S205). This control information is needed when the recorded motion image data is played back, and contains information of recording date and time, information of recording mode, information of slow stretch, thumb-nail image, and so on. The control information is recorded in memory card 200 together with the motion image data. The control information can be temporarily recorded in buffer 170 as the motion image data is done before the control information is recorded in memory card 200. In this case, controller 180 writes the information of the slow stream into the control information recorded in buffer 170. Controller 180 can write the control information recorded in buffer 170 into memory card 200 periodically.

In step S204, determining that the local slow button is depressed, controller 180 switches the frame additive synthesis mode to the frame non-additive synthesis mode, and image processor 160 does not carry out the additive synthesis process but provides all the frames of the image data output from CMOS image sensor 140 with NR (noise reduction) process (step S206). To be more specific, image processor 160 does not provide the motion image data in the frame additive synthesis mode (i.e. from the first frame to the third frame, and from the fourteenth frame to the sixteenth frame shown in FIG. 4) with the NR process, but provides the motion image data in the frame non-additive synthesis mode (i.e. from the fourth frame to the thirteenth frame shown in FIG. 4) with the NR process.

The reason why the NR process is carried out in the frame non-additive synthesis mode is described hereinafter. Since the motion image data in the frame additive synthesis mode is formed by adding and synthesizing motion image data of two frames, the S/N ratio of this motion image data is improved from the motion image data in the non-additive synthesis mode. As a result, when motion image data having undergone the additive synthesis process and motion image data without the additive synthesis process are played back in series, a discomfort happens to viewers at a seam between these two motion image data because of the difference in S/N ratios. To overcome this discomfort, the motion image data in the frame non-additive synthesis mode is provided with the NR process, so that the difference in the S/N ratios between these two motion image data can be reduced and the discomfort to the viewers at the seam between these two motion image data can be also reduced.

The step moves on to step S207, where controller 180 keeps recording the motion image data in the frame non-additive synthesis mode as shown in FIG. 4 until the local slow button of operational member 210 is depressed.

At this time, since a high speed shooting is carried out, controller 180 can handle audio data in the frame non-additive synthesis mode as silent data and record this silent audio data in memory card 200, or can produce audio having a speed compatible with the high speed shooting and record the audio in memory card 200.

During the high speed shooting, controller 180 monitors whether or not the local slow button is depressed (step S208). In the case of the local slow button being depressed (branch Yes of step S208), controller 180 writes a frame number, corresponding to the depression of the local slow button, into the control information as slow stretch information (i.e. an end frame of the slow stretch, namely, the thirteenth frame in the example shown in FIG. 4) (step S209).

The step then returns to step S203, where controller 180 switches the frame non-additive synthesis mode to the frame additive synthesis mode, and keeps recording the motion image data in the frame additive synthesis mode until the local slow button of operational member 210 is depressed next time.

A record-stop action is done by depressing the motion picture recording button. The record-stop action is an interrupt action, and it is executed at an appropriate timing during the record of the motion picture after the depression of the motion picture recording button. Controller 180 stops recording of the motion image data into memory card 200 upon the depression of the motion picture recording button.

During the high speed shooting in the frame non-additive synthesis mode (step S207), when the motion image recording button of operational member 210 is depressed, controller 180 writes a frame number corresponding to the depression of the motion image recording button into the control information as slow stretch information. This is an action similar to when the local slow button is depressed in step S208 discussed above. Controller 180 then stops recording the motion image data into memory card 200.

2-2. Motion Picture Playback Action

A motion picture playback action by digital video camera 100 is demonstrated hereinafter with reference to FIG. 3 and FIG. 4. FIG. 3 is a flowchart of playing back the motion picture that includes the slow stretch shot with digital video camera 100. When digital video camera 100 is set in the picture playback mode, controller 180 reads the thumbnail images from the control information recorded in memory card 200, and monitor display 220 displays a list of thumbnail images read out. The user selects any one of the thumbnail images from the list, thereby determining the motion image data to be played back.

Controller 180 monitors whether or not the motion picture playback button is depressed (step S300). A depress of the motion picture playback button (branch Yes of step S300) prompts controller 180 to read out a motion picture stream of the motion image data to be played back from memory card 200, and then image processor 160 starts the playback process (step S301). Controller 180 serves the function of the readout section that reads out the motion picture stream to be played back from memory card 200. A selection of the motion image data to be played back can be a trigger for starting the playback process instead of the depression of the motion picture playback button.

Next, controller 180 reads in the slow stretch information from the control information that controls the motion image data to be played back. The slow stretch information includes the information of a start frame and an end frame (step S302). Controller 180 thus understands in which frame-stretch a high speed shooting was carried out when the motion image data to be played back has been recorded. In other words, controller 180 obtains the serial numbers of the start frame and the end frame of the slow stretch shot at a high speed and recorded.

Upon receiving the command to start the playback, controller 180 starts counting the number of frames of the motion image data to be played back (step S303). At this time, controller 180 numbers the frame to be played back firstly as the first frame as illustrated by the played back data in FIG. 4, and then numbers sequentially the frames in the order of playback. For instance, frame number 816 is the frame counted by controller 180 as the $816^{th}$ frame.

In the case of playing back the motion image data not in the slow stretch, controller 180 prompts image processor 160 to play back the motion image data (first to third frames shown in FIG. 4) to be played back without providing the frame interpolation (step S304). This stretch is not a slow stretch but a normal speed stretch, so that the data is played back at an equal speed to a normal shooting speed.

Receiving the slow stretch information (i.e. the serial numbers of a start frame and an end frame) obtained from the control information and the result of counting the number of frames, controller 180 monitors whether or not the playback process of the motion image data to be played back arrives at the slow stretch (step S305). When controller 180 determines that the playback process of the data will not arrive at the slow stretch (branch No of step S305), controller 180 keeps playback action in step S304.

When controller 180 determines that the playback of the data arrives at the slow stretch (the stretch from the fourth frame to the thirteenth frame shown in FIG. 4) (branch Yes of step S305), image processor 160 interpolates a new frame between each frame of the motion image data (60 fps) to be played back. These new frames are generated based on the frames arranged in time-series. For instance, as FIG. 4 shows, in order to interpolate one frame between the fourth frame and the fifth frame, motion image data constituting the one frame is generated based on the motion image data of the fourth and the fifth frames. The method for interpolating a frame is not limited to the foregoing one, for instance, each frame can be played back taking a longer time such as two times longer, three times longer, namely, simple multiple times longer. Here is another method; in addition to this method of playback with a longer time in simple multiple times, the forgoing method of generating a new frame based on the two frames arranged in time-series can be implemented.

In this embodiment, a newly generated one frame is interpolated between each frame constituting the motion image data to be played back, where this new frame is generated based on the two frames arranged in time-series. As a result, the motion image data to be played back in the slow stretch amounts to double in data volume. As described in item 2-1 (Motion Picture Recording Action), the data amount of the motion image data recorded in the slow stretch of the record stream is 120 frames per second, so that a data amount played back in the slow stretch through the frame interpolation process becomes twice, namely, 240 frames per second. Monitor display 220 plays back and displays this motion image data having a data amount of 240 fps at the rate of 60 frames per second. As a result, the motion picture is played back in slow motion at a rate of as slow as ¼ times speed.

As discussed in this embodiment, the frames in the slow stretch shot at 120 fps are played back at ½ times speed without the frame interpolation process. On the other hand, the frames provided with the frame interpolation process that doubles the number of frames are played back in slow motion at ¼ times speed. However, the frame interpolation process can be changed for increasing a data amount three times or four times, the playback is done in slow motion at ⅙ times or ⅛ times speed respectively.

In this embodiment, motion image data is played back at 60 fps and displayed; however, the data can be played back at 120 fps and displayed. In this case, the motion image data of the slow stretch can be played back at ½ times speed.

When the step returns to step S305 and during the playback of the slow stretch, receiving the slow stretch information (i.e. the serial numbers of the start frame and the end frame) obtained from the control information and the result of counting the number of frames, controller 180 monitors whether or not the motion image data to be played back in the slow stretch is under playback action. When controller 180 determines that the motion image data of the slow stretch is still under playback action (branch Yes of step S305), controller 180 keeps the playback action in step S 306.

On the other hand, when controller 180 determines that the playback of the slow stretch is ended (branch No of step S305), controller 180 ends the process of interpolating a frame between each frame constituting the motion image data to be played back, and returns to the playback action without frame interpolation (step S304). In the case of the example shown in FIG. 4, the slow stretch ends at the thirteenth frame that is the end frame, and the motion image data is played back at the equal speed to the normal shooting speed from the fourteenth frame and onward that is a normal speed stretch.

The playback stop action is done by depressing the motion picture playback button of operational member 210. The playback-stop action is an interrupt action, and it is executed at an appropriate timing during the playback action after the depression of the motion picture playback button. Controller 180 stops playing back the motion image data on monitor display 220 upon receiving the depression of the motion picture playback button after starting the playback.

3. Other Embodiments

In the above embodiment, an example of a technique disclosed in this patent application is described; however, the technique disclosed in this application is not limited to the above embodiment and is applicable to other embodiments with a change, replacement, supplement, or omission. The structural elements described in the embodiment can be combined for establishing a new embodiment. An example of embodiments will be described below.

In the foregoing description, when motion image data having a normal speed is generated during the slow-stretch shooting mode, image processor 160 provides every two consecutive frames of image data output at 120 fps from CMOS image sensor 140 with one additive synthesis process, thereby generating motion image data having a frame rate of 60 fps. However, the motion image data of 60 fps can be produced by providing a frame interpolation process instead of the additive synthesis process. In this case, the frames in the slow stretch have an S/N ratio equal to that of the frames in the other stretches, so that the NR process is not needed.

In the foregoing description, the motion image data having undergone the additive synthesis process is not provided with the NR process, but the motion image data without the additive synthesis process is provided with the NR process. However, the present disclosure is not limited to this instance. To be more specific, the motion image data having undergone the additive synthesis process can be provided with an NR process on a first level, and the motion image data without the additive synthesis process can be provided with an NR process on a second level higher than the first level. In a case of shooting a night view, when a subject image is short of luminous intensity, use of such different levels of NR processes depending on the frame additive synthesis mode and the frame non-additive synthesis mode will be effective. The difference in S/N ratios between the motion image data provided with the additive synthesis process and the motion image data without the additive synthesis process can be thus reduced, and the seam at the switchover from the motion image data with the additive synthesis process to the motion image data without the additive synthesis process produces less discomfort to the viewers. An adjustment of the level of NR process can be done by, for instance, adjusting a feedback coefficient. Any NR process as long as it can reduce noises, such as a two-dimensional NR process or a three-dimensional NR process, can be used.

In the foregoing description, use of NTSC signal format is assumed, and an example, where the additive synthesis process changes a frame rate of 120 fps to 60 fps, is shown. However, the present disclosure is not limited to this example. For instance, in the case of using PAL signal format, the additive synthesis process can change a frame rate of 100 fps to the half, namely 50 fps.

In the foregoing description, the motion image data having a frame rate of 60 fps is generated from the image data having a frame rate of 120 fps and is output from CMOS image sensor 140. However, the present disclosure is not limited to this example. Motion image data having a frame rate of 30 fps instead of 60 fps can be generated from image data having a frame rate of 120 fps and can be output from CMOS image sensor 140, which can output not always at 120 fps. In short, based on image data having a first frame rate and output from CMOS image sensor 140, motion image data having a second frame rate that is 1/N times speed (N is an integer) of the first frame rate can be generated.

In the previous embodiment, when the stream is played back, controller 180 reads out the control information from memory card 200 for obtaining the information about the slow stretch, so that controller 180 can achieve the playback in slow motion. However, in order to play back the motion image data recorded in the slow stretch with this stretch being provided with the frame interpolation process, a playback apparatus needs to realize how the information about the slow stretch is embedded in the control information, and yet, the playback apparatus needs to have a function of frame interpolation. In other words, a playback apparatus that cannot obtain the information about the slow stretch and that does not have the function of frame interpolation cannot play back the motion picture in slow motion. To overcome this problem, a function called "transcode" is introduced. This transcode function allows the slow stretch to be provided with the frame interpolation process before the motion image data is recorded, whereby the foregoing playback apparatus is capable of generating motion image data to be played back in slow motion.

In the previous embodiment, controller 180 depresses the motion picture recoding button of operational member 210, and then depresses the local slow button. However, the present disclosure is not limited to this example. In other words, when the local slow button is depressed before the motion picture recording button is depressed, controller 180 can start recording the data in the frame non-additive synthesis mode from a first frame and onward. In this case, not to mention, the start frame indicated in the slow stretch information contained in the control information is numbered as a first frame.

In the above embodiment, examples of the technique disclosed in the present disclosure are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present disclosure, so that various changes, replacements, supplements, or omissions are allowed in the scope of claims described later or an equivalent scope thereto.

The imaging apparatus of the present disclosure is applicable to digital video cameras, digital still cameras, portable-phones with camera function, or smart-phones with camera function.

What is claimed is:

1. An imaging apparatus comprising:
   an image sensor that outputs image data at a first frame rate;
   an image processor that
   (i) generates motion image data having a second frame rate that is 1/N (N is an integer) of the first frame rate, based on the image data having the first frame rate output from the image sensor, for a normal speed stretch not provided with a given instruction, and
   (ii) generates motion image data having the first frame rate, based on the image data having the first frame rate output from the image sensor, for a slow speed stretch provided with a given instruction; and
   a controller that records the generated motion image data having the first frame rate and the generated motion image data having the second frame rate on a recording medium,
   wherein when the controller reads out the motion image data having the first frame rate from the recording medium, the controller plays back the motion image data having the first frame rate at the slow speed,
   wherein when the controller reads out the motion image data having the second frame rate from the recording medium, the controller plays back the motion image data having the second frame rate at the normal speed, and
   wherein the image processor:
   (i) generates the motion image data having the second frame rate by adding image data of at least two frames of the image data having the first frame rate output from the image sensor; and
   (ii) provides the motion image data having the first frame rate with a noise reduction process to a first level while providing the motion image data having the second frame rate with a noise reduction process to a second level lower than the first level.

2. An imaging apparatus comprising:
   an image sensor that outputs image data at a first frame rate;
   an image processor that
   (i) generates motion image data having a second frame rate that is 1/N (N is an integer) of the first frame rate, based on the image data having the first frame rate output from the image sensor, for a normal speed stretch not provided with a given instruction, and
   (ii) generates motion image data having the first frame rate, based on the image data having the first frame rate output from the image sensor, for a slow speed stretch provided with a given instruction; and
   a controller that records the generated motion image data having the first frame rate and the generated motion image data having the second frame rate on a recording medium,
   wherein when the controller reads out the motion image data having the first frame rate from the recording medium, the controller plays back the motion image data having the first frame rate at the slow speed,
   wherein when the controller reads out the motion image data having the second frame rate from the recording medium, the controller plays back the motion image data having the second frame rate at the normal speed, and
   wherein the image processor:
   (i) generates the motion image data having the second frame rate by adding image data of at least two frames of the image data having the first frame rate output from the image sensor; and
   (ii) provides the motion image data having the first frame rate with a noise reduction process while providing the motion image data having the second frame rate with no noise reduction process.

* * * * *